(12) United States Patent
Alpar et al.

(10) Patent No.: US 12,710,891 B2
(45) **Date of Patent: *Aug. 18, 2026**

(54) CLOUD-NATIVE CROSS-ENVIRONMENT RESTORATION

(71) Applicant: Kasten, Inc., Columbus, OH (US)

(72) Inventors: Aaron H. Alpar, Redwood City, CA (US); Thomas Manville, Mountain View, CA (US); Eric William Hamilton, Mountain View, CA (US); Vaibhav Kamra, Sunnyvale, CA (US); Niraj Tolia, Los Altos, CA (US)

(73) Assignee: Kasten, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,357

(22) Filed: Oct. 28, 2024

(65) Prior Publication Data

US 2025/0053331 A1 Feb. 13, 2025

Related U.S. Application Data

(63) Continuation of application No. 17/200,205, filed on Mar. 12, 2021, now Pat. No. 12,182,440.

(51) Int. Cl.
*G06F 3/06* (2006.01)
*G06F 11/1446* (2026.01)

(52) U.S. Cl.
CPC .......... *G06F 3/0653* (2013.01); *G06F 3/0604* (2013.01); *G06F 3/067* (2013.01); *G06F 11/1469* (2013.01); *G06F 2201/84* (2013.01)

(58) Field of Classification Search
CPC ...... G06F 3/0653; G06F 3/0604; G06F 3/067; G06F 11/1469; G06F 2201/84;
(Continued)

(56) References Cited

U.S. PATENT DOCUMENTS 8,789,187 B1 7/2014 Pennington et al.
10,061,657 B1 8/2018 Chopra et al.
(Continued)

FOREIGN PATENT DOCUMENTS

WO WO 2009/111799 A2 9/2009

OTHER PUBLICATIONS

Trilio; Features—TrilioVault for Kubernetes; "A list of impactful TrilioVault for Kubernetes features and use cases" https://docs.trilio.io/kubernetes/overview/features-and-use-cases, 4 pages.
(Continued)

*Primary Examiner* — Jared I Rutz
*Assistant Examiner* — Wei Ma
(74) *Attorney, Agent, or Firm* — Sterne, Kessler, Goldstein & Fox P.L.L.C.

(57) ABSTRACT

Disclosed herein are system, method, and computer program product embodiments for transforming backups of applications. An embodiment operates by extracting a resource snapshot into memory. The resource snapshot is formatted in a first configuration. An embodiment performs a transformation on the resource snapshot, thereby transforming the resource snapshot from the first configuration to a second configuration for an environment into which the resource snapshot is being restored. The transformation is made up of a set of operations. One of the operations includes a regular expression. Once the transformation is complete, the resource snapshot is restored to the environment based on the second configuration.

20 Claims, 4 Drawing Sheets

(58) Field of Classification Search
CPC .......... G06F 8/63; G06F 8/76; G06F 11/3698; G06F 11/1448
USPC .......................................................... 711/154
See application file for complete search history.

(56) References Cited

U.S. PATENT DOCUMENTS

| | | | |
|---|---|---|---|
| 10,795,777 | B1 | 10/2020 | Goyal |
| 2005/0066037 | A1 | 3/2005 | Song |
| 2012/0311560 | A1 | 12/2012 | Dobrovolskiy |
| 2017/0154126 | A1 | 6/2017 | Ballentine et al. |
| 2018/0091625 | A1 | 3/2018 | Hwang |
| 2018/0129679 | A1 | 5/2018 | Yao et al. |
| 2018/0349405 | A1* | 12/2018 | Augustine ........... G06F 16/1767 |
| 2019/0385014 | A1* | 12/2019 | Malak .................. G06F 40/146 |
| 2020/0186416 | A1 | 6/2020 | Hashimoto |
| 2020/0226120 | A1 | 7/2020 | Ros |
| 2020/0233877 | A1 | 7/2020 | Patel et al. |
| 2020/0301891 | A1* | 9/2020 | Dornemann .......... G06F 16/183 |
| 2021/0117611 | A1* | 4/2021 | Liu ..................... G06F 16/2282 |
| 2021/0271564 | A1 | 9/2021 | Mitkar et al. |
| 2022/0291859 | A1 | 9/2022 | Alpar et al. |

OTHER PUBLICATIONS

Arundel, J. et al., “Cloud Native with DevOps with Kubernetes”, Jan. 24, 2019 (Jan. 24, 2019), pp. 1-344, XP055704783, Retrieved from the Internet: URL:https://github.com/ffisk/books/blob/master/Cloud-Native-Devops-with-Kubernetes-f u11-book.pdf [retrieved on Jun. 15, 2020).

International Search Report and Written Opinion of the International Searching Authority directed to related International Patent Application No. PCT/IB2021/052333, mailed Dec. 14, 2021; 11 pages.

* cited by examiner

CLOUD-NATIVE CROSS-ENVIRONMENT RESTORATION

CROSS-REFERENCE TO RELATED APPLICATIONS

This application is a continuation of U.S. patent application Ser. No. 17/200,205, filed on Mar. 12, 2021, the contents of which are incorporated herein by reference in its entirety.

BACKGROUND

Data management increasingly relies on cloud services. Cloud services can include application mobility across multiple devices, as well as backup and recovery of resources. The ability to backup and restore or clone a user's computing applications or environment to different devices or locations provides great flexibility. Users of such backup and restore services often run into problems when interfacing between different providers of services. For example, different flavors or versions of a cloud management platform can create different backup formats. And users may have devices that utilize different environments. A backup saved from one environment or in one format is not always compatible with another. The backup can be transformed to allow cross-environment restoration, but existing approaches make use of transformation techniques that are limited in their efficiency and flexibility.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
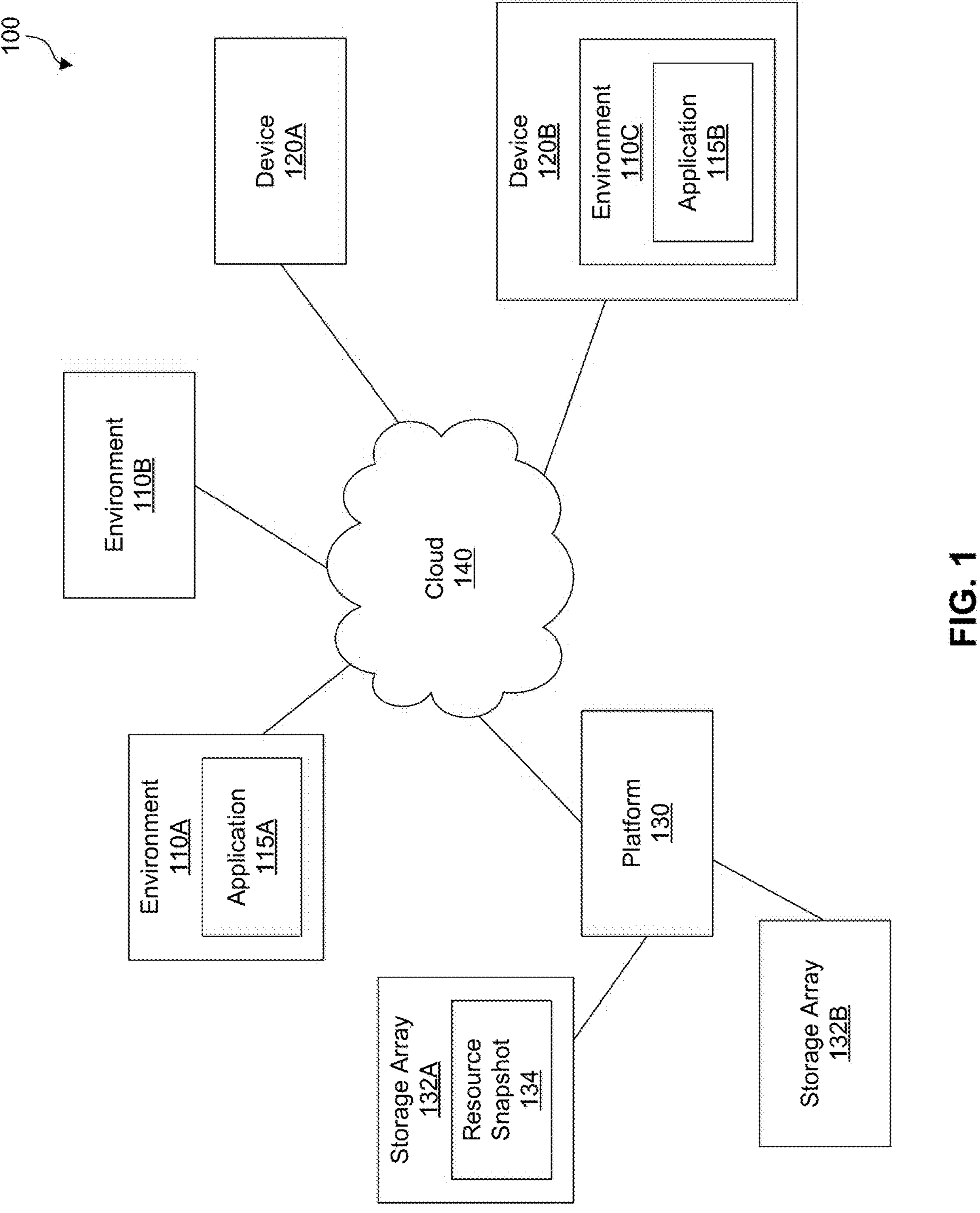
FIG. 1 is a block diagram of a cloud backup system, according to some embodiments.

Provided herein are system, apparatus, device, method and computer program product embodiments, and/or combinations and sub-combinations thereof, for restoring an application from a resource snapshot to a different environment than the one from which the resource snapshot was taken. In some embodiments, a transformation with operations that include globbing and regular expressions transforms the resource snapshot, providing for more efficient coding than existing transformations.

Resource snapshots can be created from applications to provide a backup to an application. Resource snapshots can be backup files configured based on the system creating the backup. For example, Kubernetes® is a cloud environment that uses resources for backup files. The resource snapshot can be made up of the different resources, such as workload resources, service resources, config and storage resources, authentication resources, authorization resources, policies resources, extend resources, cluster resources, custom resources, and other variations or combinations of cloud backup resources, as would be appreciated by a person of ordinary skill in the art.

Cloud backup systems can provide backup services and allow users to back up their applications and restore them to different devices through the cloud. Sometimes, these different devices use different environments, such as different operating systems or different web services. Cloud backup systems often create resource snapshots based on the environment in which the application exists. However, each environment can have a different specification for how to configure the resource snapshot.

The variation of resource snapshot due to the different specifications can prevent a user from restoring an application to a device operating in a different environment. In some embodiments, a resource snapshot can be modified to change from a first configuration that the resource snapshot was created in to a second configuration for an environment to which the application in the resource snapshot is to be restored.

In some cloud backup services, the resource snapshot is a hierarchical structure that identifies different parts of memory where portions of a backed up application can be accessed. Differences between resource snapshot configurations can be based on the values and paths in the hierarchical structure. Because the differences are based on values and paths, a transformation of the snapshot can result in no loss of fidelity of the backup. This lack of fidelity loss results from the transformation changing the names and locations while leaving the data itself unchanged.

Efforts have been made to use JavaScript Object Notation (JSON) Patch to define the changes to a resource snapshot using JSON Patch operations. The operations can add, move, replace, copy, or remove paths and values in the resource snapshot.

However, JSON Patch requires knowledge of the paths and values that the operations will act on. This can become problematic when one-to-many operations are contemplated. For one-to-many operations, JSON Patch requires a first operation to select the source path or value and then an operation for each of the destination with the appropriate destination path or value. Further, the entire path or value must be known. In some cases, there can be multiple source paths as well, requiring additional operations.

Additionally, in some cases, transformation can require replacing portions of path or value labels with different words. Using JSON Patch, the entire new path or value label must be included. This means that, instead of selecting portions of path or value labels, an entirely new path must be included in the JSON Patch operation(s) that includes the sub-portions.

What is needed to solve these technological problems is a set of operations that can abstract the paths or values for the sources and destinations elements and select the required portions of the path or value labels without requiring explicit knowledge and description of the paths and values.

One approach for abstracting paths or values is globbing. Through the use of a wildcard character, such as a single or double asterisk, globbing allows abstracting of strings of characters. Wildcard characters can allow a path reference or value reference to be extended to match or select paths or values that include an unspecified string in the location of the wildcard character.

For example, a string can list several levels of a path, such as "/metadata/labels/." This string can have multiple further hierarchical levels, such as "/metadata/labels/app," "/metadata/labels/version", and "/metadata/labels/release." The string can also exist at a subpath of another portion of the hierarchy, such as "/spec/template/metadata/labels/app." Using regular JSON Patch commands, each of these paths would need to be specified. Globbing allows the use of a wildcard to replace the higher and lower levels of the hierarchy. A double asterisk can indicate any number of levels, while a single asterisk can indicate a single level. Thus, if the intention is to copy the value into any first subpath of the "/metadata/labels/" (e.g., the "app," subpath, but not any further subpaths of "app") for any instance of "/metadata/labels/" (e.g., the string "/metadata/labels/" can exist at any level of the hierarchy), these can all be identified by "**/metadata/labels/*" using globbing. Instead of having to know and include the entire path, the use of globbing allows an operation to access every path satisfying the string.

One approach for selecting sub-portions of labels is the use of regular expressions. Regular expressions can target specific strings in a path or label name using a capture group and assign it to a capture group reference. The capture group reference can then be combined with other strings to create the new path or value label.

For example, a transformation can require changing a format for version values. A regular expression can be given a path and target the existing version value labels using the regular expression string "(.*)." This regular expression can capture any value label string at the path that has a "." character with a string after it (e.g., the asterisk here is a wildcard as described above). The values captured by the regular expression can then be assigned using a capture group reference, such as "$1." The capture group reference can be combined with any other string, such as by the string "v$1," which combines the capture value in the regular expression with a leading letter "v."

A capture group reference can be used multiple times in the same assignment (e.g., "$1.value.$1"). If more than one capture group is present, each capture group can be indexed by changing the number in the capture group reference (e.g., the first capture group reference is "$1" and the second capture group reference is "$2", and so on).

Regular expressions can allow transformations that create new path and value labels from existing ones, allowing the transformation to make use of the existing resource snapshot in the transformation. Without regular expressions, the old path or value label must be known and then an operation must explicitly define the entire new path or value label. Regular expressions allow for modification and building of new path and value labels directly from the needed portions of the old ones within the transformation.

But JSON Patch suffers from a technological problem. For example, JSON Patch is not configured to provide for the use of globbing and regular expressions. Embodiments herein makes use of a new implementation of JSON Patch that modifies JSON Patch based on the existing JSON Patch specification to allow for the use of globbing and regular expressions within JSON Patch operations. This new implementation is referred to herein as "Modified JSON Patch." Modified JSON Patch can use globbing and regular expressions to provide the added functionality to more efficiently and flexibly define operations for the transformation of resource snapshots to new environments. In some embodiments, Modified JSON Patch can allow for transformation of a resource snapshot to a new environment using fewer operations.

FIG. 1 is a block diagram of a cloud backup system 100, according to some embodiments. In some embodiments, cloud backup system 100 has environments 110, devices 120, and a platform 130 connected together through a cloud 140. Cloud 140 can be a network or combination of networks, including the internet, a local area network (LAN), a wide area network (WAN), a wireless network, a cellular network, or various other types of networks, as would be appreciated by a person of ordinary skill in the art. Environments 110, devices 120, and platform 130 connected together through cloud 140 can operate on the networks of cloud 140 or be connected thereto.

In some embodiments, environments 110, such as environment 110A, 110B, and 110C, can run applications 115, such as application 115A and 115B. Environments 110 can be operating systems or cloud environments for a computer, mobile device, other network-enable device, or virtual operating systems run from a server. Each environment 110 can have its own operating system or cloud environment. For example, environment 110A can run a Microsoft Windows® operating system, environment 110B can run a Linux® operating system, and environment 110C can run Amazon Web Services® (AWS®). In another example, some of environments 110 can run the same operating system or cloud environment as each other while other environments 110 can run a different operating system or cloud environment. In yet another example, environment 110A can run a first version of AWS®, while environment 110B runs a second version. These different versions can be the result of different "flavors" of the environment (e.g., different features) or different builds (e.g., the differences can be the result of patches or version updates to the software).

Applications 115 can be different programs that run in environments 110. For example, application 115A can be a word processing application and application 115B can be a database application. In some embodiments, applications 115 can be configured to run in more than one environment 110.

Environments 110 can be accessed by or run on devices 120, such as devices 120A and 120B through cloud 140. Devices 120 can be computers, mobile devices, thin clients, or other network-enabled devices as would be appreciated by a person of ordinary skill in the art. In some embodiments, devices 120 can be computer systems 400, described further below in FIG. 4. In some embodiments, devices 120 can run an environment 110 as an operating system. For example, device 120B can be a personal computer with environment 110C being a Microsoft Windows® operating system running on it. In some embodiments, devices 120 can run an environment 110 through cloud 140. For example, device 120A can be a thin client configured to run environment 110B through cloud 140 from a server, with environment 110B being a Microsoft Windows® operating system configured to be run by a thin client.

Platform 130 can be a system configured to provide cloud services, including backup and restoration functions for devices 120 and applications 115 that are run on them. In some embodiments, platform 130 can be computer system 400, described further below in FIG. 4. Platform 130 can store resource snapshots 134 of applications 115 in storage arrays 132, such as storage array 132A and 132B. Devices 120 can access platform 130 through cloud 140 to use the cloud services. For example, device 120B can access platform 130 through cloud 140 to backup application 115B. Platform 130 can store resource snapshot 134 of application 115B on storage array 132A. As another example, device 120A can access platform 130 through cloud 140 to restore an application 115 in resource snapshot 134. Device 120A can run environment 110B and use platform 130 to restore the resource snapshot 134 as an application 115 to environment 110B (application 115 in this case is not shown).

Resource snapshot 134 can be a cloud resource document or configuration file, or a combination of cloud resource documents and configuration files. For example, Kubernetes® is a cloud environment that uses resources for backup files. In some embodiments, one or more Kubernetes® resources can make up resource snapshot 134, including workload resources, service resources, config and storage resources, authentication resources, authorization resources, policies resources, extend resources, cluster resources, custom resources, and other variations or combinations of cloud backup resources, as would be appreciated by a person of ordinary skill in the art.

As an example, resource snapshot 134 can include a document or configuration file containing a hierarchical data structure that specifies where different executable bits for the backup of application 115 are deployed. Platform 130 or environment 110 can be configured to deploy the executable bits based on their location and descriptor in the hierarchical data structure.

As another example, resource snapshot can include a network configuration required to access application 115 that can run in a backup or on another environment 110. Platform 130 or environment 110 can be configured to allow application 115 to be restored in environment 110 based on the network configuration.

In some embodiments, resource snapshot 134 can be in a markup language, such as YAML Ain't Markup Language (YAML) or Extensible Markup Language (XML). In some embodiments, resource snapshot 134 can be formatted in JSON.

Resource snapshot 134 can be configured or formatted based on environment 110 from which it is created. Environment 110 can have a configuration that it requires backup data (e.g., resource snapshot 134) to be formatted in in order to restore the backup data into environment 110. In some embodiments, resource snapshot 134 can be configured with a hierarchical data structure specific to environment 110. The hierarchical data structure can be in a tree structure with branches and leaves. In some embodiments, resource snapshot 134 can have names or labels in the hierarchical data structure that are specific to environment 110. The names or labels can be assigned to different branches and leaves of the tree.

For example, resource snapshot 134 can be created for application 115A on environment 110A. Environment 110A can be a Microsoft Windows® operating system and resource snapshot 134 can be configured based on a backup specification for Microsoft Windows® operating systems that defines the hierarchical data structure and labels for the hierarchical data structure.

Figure 2:
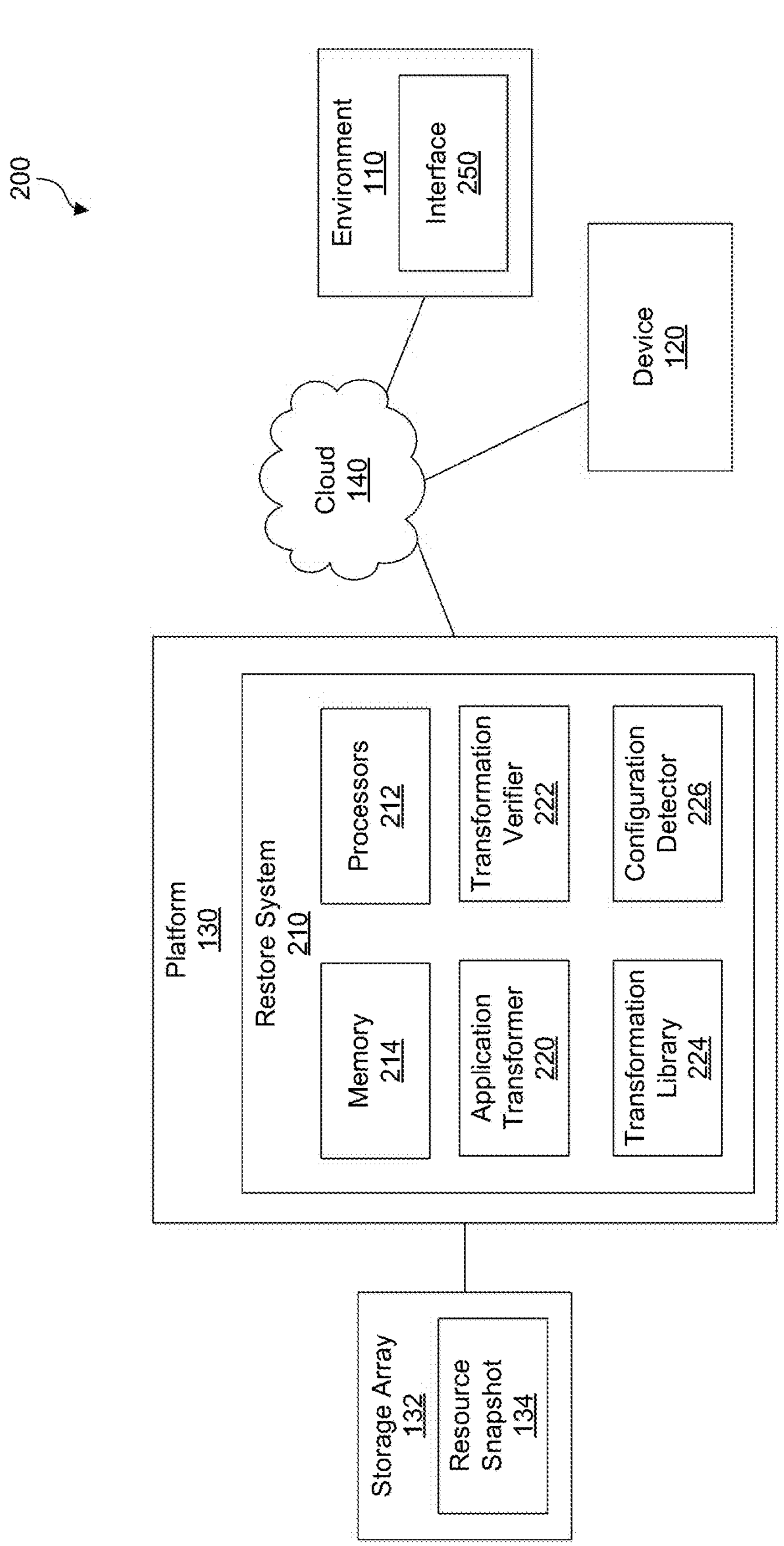
FIG. 2 is a block diagram of a cloud backup system with a restore system, according to some embodiments.

FIG. 2 is a block diagram of a cloud backup system 200 with a restore system 210, according to some embodiments. Cloud backup system 200 can be an embodiment of cloud backup system 100 described above in FIG. 1.

In some embodiments, restore system 210 can have processors 212, memory 214, application transformer 220, transformation verifier 222, transformation library, and configuration detector 226. In some embodiments, platform 130 can be a computer system, such as computer system 400 described below in FIG. 4. In some embodiments, restore system 210 can be distributed among cloud or network resources or systems.

Memory 214 can store instructions configured to, when executed by processors 212, perform restoration services for device 120. In some embodiments, memory 214 can store transformation library 224.

Processors 212 can perform operations for instructions stored in memory 214. In some embodiments, processors 212 can be part of a computer system 400, described below in FIG. 4. In some embodiments, processors 212 can perform operations for application transformer 220, transformation verifier 222, and configuration detector 225.

Application transformer 220 can extract resource snapshot 134 into memory 214. Application transformer 220 can apply transformations to a resource snapshot 134, including after resource snapshot 134 has been extracted, to change formatting or element names in resource snapshot 134.

In some embodiments, after application transformer 220 applies a transformation to resource snapshot 134, transformation verifier 222 can verify that the transformation was successful. Transformation verifier 222 can verify a transformed resource snapshot by verifying that the transformed resource snapshot is properly formatted or checking that the target environment (e.g., environment 110) is one that restore system 210 is capable of restoring resource snapshots 134 into. In some embodiments, transformation verifier 222 can check whether an application 115 backed up in resource snapshot 134 is already present in environment 110.

In some embodiments, application transformer 220 can restore resource snapshot 134 into environment 110. In some embodiments, resource snapshot 134 can be restored by application transformer 220 after application transformer 220 transforms resource snapshot 134. In some embodiments, resource snapshot 134 can be restored by application transformer 220 after transformation verifier 222 verifies the transformation performed by application transformer 220.

In some embodiments, when transformation verifier 222 determines that the transformation failed, application transformer 220 does not restore resource snapshot 134 and generates an error message that is sent to the user. In some embodiments, when transformation verifier 222 determines that the application backed up in resource snapshot 134 is already present in environment 110, application transformer 220 does not restore resource snapshot 134 and generates an error message that is sent to the user.

The transformation used by application transformer 220 can be individual programs or operations, such as Modified JSON Patch operations, or a complete transformation that is equivalent to the individual pieces. For example, four Modified JSON Patch operations can be used to transform resource snapshot 134 for restoration into environment 110. A single transformation could be created that performs the equivalent of the four Modified JSON Patch operations. In some embodiments, using individual operations can allow the transformation to be applied piece by piece and provide for reuse of operations that are common for different transformations. In some embodiments, using a complete transformation can allow for a standard transformation that can be reused for transformations from a first environment 110 to a second environment 110. In some embodiments, transformation library 224 can contain one or more transformations, including the individual pieces of transformations.

In some embodiments, a transformation is a document composed of commands or operations to be performed on resource snapshot 134. Each operation within the document is performed in sequence. Processing halts if an operation results in an error. If the error is the result of a test failure in a test operation, processing will continue to the next document, otherwise, the restore will fail.

In some embodiments, the transformation used by application transformer 220 can be supplied by a user to application transformer 220. In some embodiment, the user can select transformations from transformation library 224. In some embodiments, the user can identify environment 110 that resource snapshot 134 was created in and the new environment 110 that resource snapshot 134 is being restored into and application transformer 220 can select the appropriate transformation from transformation library 224.

As a first non-limiting example of an operation in a transformation, the operation can be a replacement of a value in a path. A path can be defined, such as "/spec/replicas," and a string can be defined, such as "5." The replace operation can receive the path and the string and replace whatever is at the path with the string.

As a second non-limiting example, the operation can be a replacement of a value in a path. This replace example includes regular expressions and a wildcard. A path can be specified, such as "/spec/template/spec/template/containers/0/image," a regular expression can be defined, such as ".*[/]([a-z/]+):([0-9.]+)," and a string can be defined, such as "$2/$1." If any of the elements in the path match the regular expression, they are replaced by the value in the string. Note that here, the regular expression has two capture groups and that the string reverses their order and places a "/" character between them using the two capture group references.

As a third non-limiting example, the operation can be a test operation. A path, such as "/metadata/name," and a regular expression, such as "nginx.*," can be provided. The test operation checks to see if the string element at the path matches the regular expression. The test operation results in a pass or a fail. Note that here, the use of "*" is the wildcard character used in regular expressions. Thus, as long as the string begins with "nginx," the regular expression will match to any additional string information contained at the path.

As a fourth non-limiting example, the operation can be a copy operation. A from path, such as "metadata/labels/app," a destination path, such as "**/metadata/labels/*," a regular expression, such as "(.*)," and a string, such as "prod-$1," can be provided. The copy operation identifies any string values at the from path which match the regular expression. The regular expression captures these matching strings into the capture group. The string is formed from the characters (e.g., "prod-") and the capture group reference (e.g., "$1) that matches the matching strings in the capture group. This string is then copied into the destination path. Note that here, the destination path includes two wildcards, so this example copy operation can potentially be a one-to-many copy, with the string being copied into any path that includes "/metadata/labels/" and has a subpath below "/metadata/labels/."

As a fifth non-limiting example, another copy operation can receive a from path, such as "/spec/containers/**/volumeMounts/name," a destination path, such as "/spec/containers/$1/volumeMounts/mountPath," a regular expression, such as "^(logging-data|save-data)$," and a string, such as "/mnt/$1." The copy operation identifies any string values at the from path which match the regular expression. In this case, the from path includes a globbing wildcard, so the from path can have any number of subpaths in the place of the wildcard, as long as they are surrounded by the explicit path strings in the from path. The regular expression captures these matching strings in to the capture group. In this case, there are two possible strings: "logging-data" and "save-data." If the regular expression finds either of these, it will add the value to the capture group. The regular expression can find one, both, or neither. The string is formed from the characters (e.g., "/mnt/") and the capture group reference (e.g., "$1) that matches the matching strings in the capture group. This string is then copied into the destination path. This string is itself a path, with the capture group reference providing the ending string in the path. Note that here, the destination path also includes the capture group character. The inclusion of the destination path in the capture group character allows for the copy operation in this this example to create different destination paths, depending on how many matches the regular expression finds.

Other operations available in JSON Patch are available in Modified JSON Patch, as would be appreciated by a person of ordinary skill in the art. Transformations of resources snapshots 134 using Modified JSON Patch can be accomplished using various regular expressions and globbing more efficiently and effectively than using only JSON Patch.

In some embodiments, configuration detector 226 can detect environment 110 that resource snapshot 134 was backed up from and environment 110 that resource snapshot 134 is being restored into. In some embodiments, configuration detector 226 can provide the detected environments to the user. In some embodiments, configuration detector 226 can detect the transformation needed to restore resource snapshot 134 into environment 110. In some embodiments, configuration detector 226 can provide the detected transformation to the user.

In some embodiments, configuration detector 226 can provide the detected transformation to the application transformer 220 and application transformer 220 can select the appropriate transformation from transformation library 224 and apply it to resource snapshot 134.

Device 120 can run environment 110. In some embodiments, device 120 can access environment 110 through cloud 140. As described above for FIG. 1, other embodiments are possible, such as where environment 110 is run directly on device 120. A user can access an interface 250 running in environment 110 on device 120. Interface 250 can provide the user access to controls for platform 130, including restore system 210, through cloud 140. The user can select resource snapshot 134 from storage array 132 and restore an application 115 backed up in resource snapshot 134 to environment 110. In embodiments where environment 110 is different from the original environment that resource snapshot 134 was backed up from, the user can use application transformer 220 as described above to transform resource snapshot 134 prior to performing restoration. In some embodiments, as part of the transformation process, interface 250 can provide the user access to transformation verifier 222, transformation library 224, and configuration detector, which can perform the functions described above.

Figure 3:
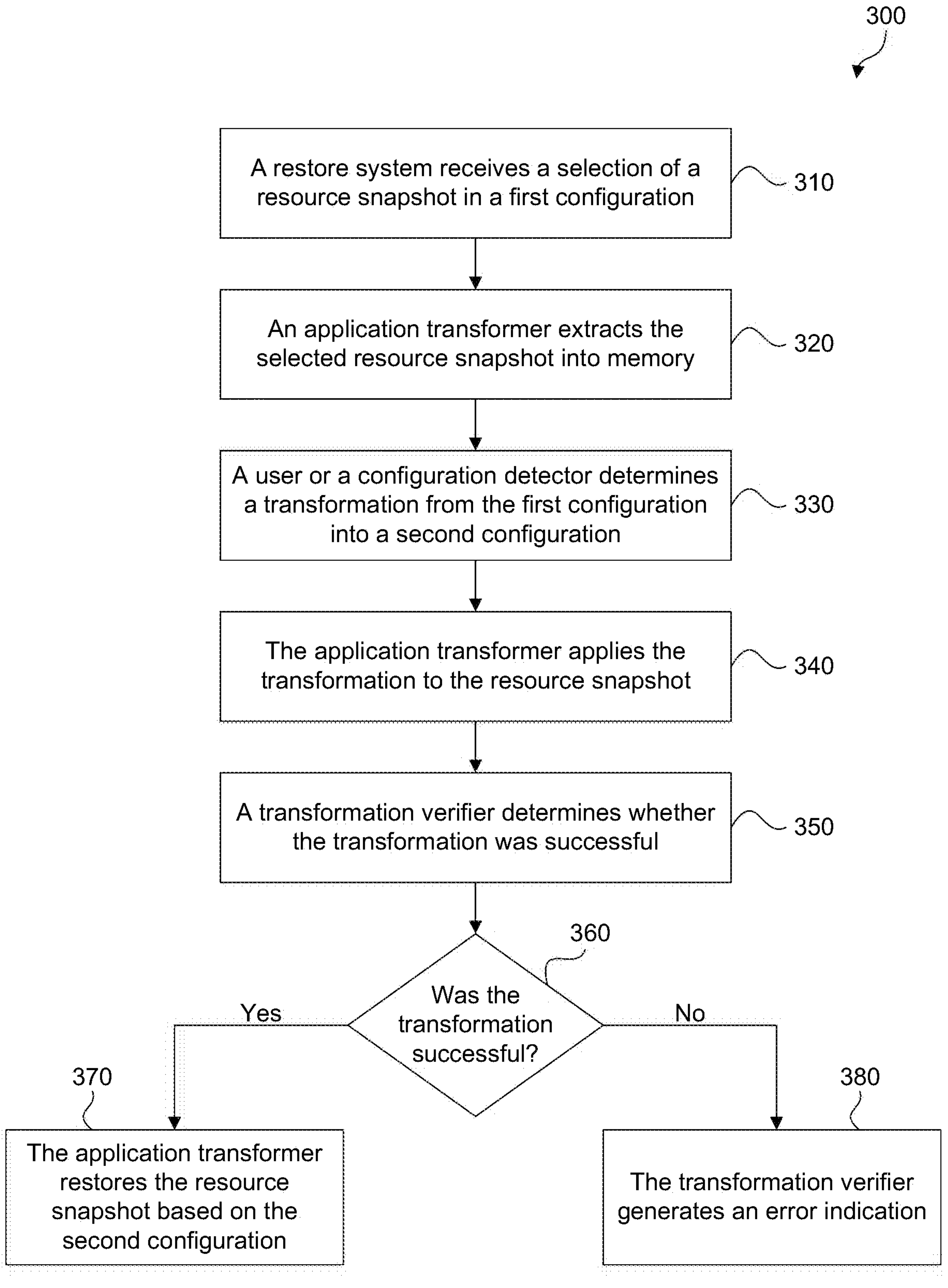
FIG. 3 is a flowchart illustrating a method for transforming and restoring a resource snapshot, according to some embodiments.

FIG. 3 is a flowchart illustrating a method 300 for transforming and restoring a resource snapshot 134, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. For example, method 300 can be performed by computer system 400, as described in FIG. 4. Further, some of the steps can be performed simultaneously, or in a different order than shown in FIG. 3, as will be understood by a person of ordinary skill in the art. Method 300 shall be described with reference to FIG. 2. However, method 300 is not limited to that example embodiment.

In 310, restore system 210 receives a selection of resource snapshot 134 in a first configuration. In some embodiments, application transformer 220 can receive the selection. The resource snapshot 134 has the first configuration corresponding to a configuration for backup files for an environment 110 that resource snapshot 134 was created from. Resource snapshot 134 can be a backup for an application 115.

The selection can be made by a user. For example, a user can select resource snapshot 134 through interface 250. The user can access interface 250 on device 120 and interface 250 can be running in environment 110.

In 320, application transformer 220 extracts the selected resource snapshot 134 into memory 214. Extracting the selected resource snapshot 134 into memory 214 can involve decompressing or otherwise formatting or accessing the selected resource snapshot to be loaded into memory 214.

In 330, a user or configuration detector 226 determines a transformation from the first configuration into a second configuration.

In some embodiments, the user can determine the transformation. In some embodiments, the user can write or access the transformation and provide the transformation to application transformer 220 or processor 212 through interface 250. In some embodiments, the user can determine a necessary transformation and select the appropriate transformation from transformation library 224. In some embodiments, processor 212 or application transformer 220 receives a selection of the second environment from the user.

In some embodiments, configuration detector 226 can determine the transformation by detecting the first configuration of resource snapshot 134 and the second configuration of environment 110. In some embodiments, configuration detector 226 can provide the first and second configurations to the user, including via processor 212. In providing a configuration to the user, in some embodiments, configuration detector 226 can output a description of the configuration. In some embodiments, the description of the configuration can be a label or title indicating the format or structure required by the configuration. In some embodiments, the description of the configuration can be the actual format or structure, or a description of the actual format or structure that allows the user to identify the paths and labels that need to be transformed.

Configuration detector 226 or processor 212 can also provide the determined transformation to the user. In some embodiments, the user can provide the necessary transformation to processor 212 or application transformer 220 through interface 250 or from transformation library 224. In some embodiments, configuration detector 226 can provide the determined transformation to application transformer 220 from transformation library 224. In some embodiments, a test operation can be used to detect a configuration of the second environment by testing one or more paths or values in the second environment.

In 340, application transformer 220 applies the transformation to selected resource snapshot 134. The transformation can transform the configuration of resource snapshot 134 from the first configuration to the second configuration. The transformation can be performed in memory 214. The transformation can include a set of operations that transform the resource snapshot from the first configuration to the second configuration. In some embodiments, the transformation applies at least one operation that includes a regular expression that selects at least a portion of a path in resource snapshot 134 or at least a portion of a value in the path in resource snapshot 134 for use in the operation. The operation can be applied using the at least a portion of the path in the resource snapshot or the at least a portion of the value in the path in the resource snapshot. In some embodiments, the transformation applies at least one operation that includes a path reference or a value reference with a wildcard character.

In 350, transformation verifier 222 determines whether the transformation was successful. In some embodiments, transformation verifier 222 determines whether the transformation was successful by comparing the transformed resource snapshot to a known specification for the second configuration. In some embodiments, transformation verifier 222 determines whether the transformation was successful by attempting to restore the transformed resource specification 134 in memory 214. In some embodiments, transformation verifier 222 determines whether the second configuration is one to which resource snapshots 134 can be restored, based on a known list of configurations to which restore system 210 is configured to restore resource snapshots 134. In some embodiments, transformation verifier 222 also determines whether application 115 backed up in resource snapshot 134 is present in a target environment (e.g., environment 110).

In some embodiments, where transformation verifier 222 determines that the transformation succeeded, method 300 proceeds to 370. In embodiments where transformation verifier 222 determines that application 115 backed up in resource snapshot 134 is not present in the target environment (e.g., environment 110), method 300 proceeds to 370.

In some embodiments, where transformation verifier 222 determines that the transformation failed, method 300 proceeds to 380. In embodiments where transformation verifier 222 determines that application 115 backed up in resource snapshot 134 is present in the target environment (e.g., environment 110), method 300 proceeds to 380.

In some embodiments, transformation verifier 222 applies a test operation to determine that the resource snapshot is configured according to the second configuration.

In 360, if the transformation was successful, method 300 proceeds to 370. If the transformation was not successful, method 300 proceeds to 380.

In 370, Application transformer 220 restores resource snapshot 134 based on the second configuration. Restoring resource snapshot 134 based on the second configuration can restore, install, or instantiate application 115 that is backed up in resource snapshot 134 in target environment 110 that uses or requires the second configuration.

In some embodiments, the restoration is performed in response to transformation verifier 222 determining that applying the transformation succeeded. In some embodiments, the restoration is performed in response to transformation verifier 222 determining that the application does not exist in target environment 110.

In 380, transformation verifier 222 generates an error indication. In some embodiments, application transformer 220 can generate the error indication. The error indication can be generated by processor 212, application transformer 220, or transformation verifier 222. The error indication can be provided to the user via interface 250.

Transformation verifier 222 can perform 380 in response to determining that the transformation failed or that application 115 backed up in resource snapshot 134 is present in the target environment (e.g., environment 110). In some embodiments, 380 includes skipping the restoring of application 115 in target environment 110.

Figure 4:
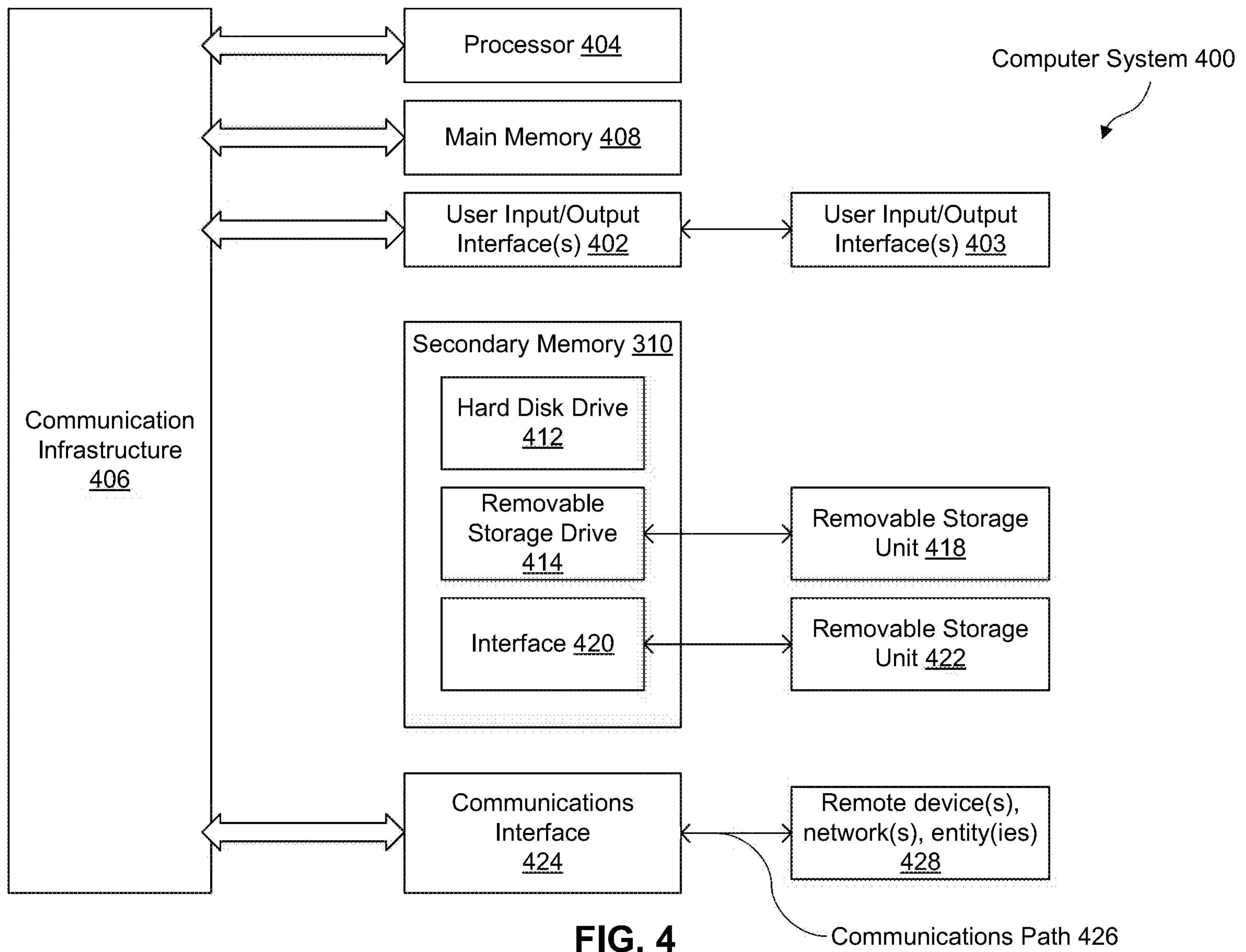
FIG. 4 is an example computer system useful for implementing various embodiments.

FIG. 4 is an example computer system useful for implementing various embodiments.

Various embodiments can be implemented, for example, using one or more computer systems, such as computer system 400 shown in FIG. 4. Computer system 400 can be used, for example, to implement method 300 of FIG. 3. For example, computer system 400 can transform resource snapshot 134 from a first configuration to a second configuration and restore the transformed configuration into environment 110. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JSON, XML, YAML, Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for restoring an application, comprising:

performing, by a processor, a transformation, comprising a set of Modified JavaScript Object Notation (JSON) Patch operations, on a resource snapshot that specifies a first resource configuration indicating where portions of the application are accessed in a first cloud environment, thereby transforming the resource snapshot from the first resource configuration to a second resource configuration indicating where portions of the application are accessed in a second cloud environment, wherein performing a Modified JSON Patch operation from the set of Modified JSON Patch operations comprises:

selecting, using a regular expression, a plurality of strings in a path in the resource snapshot or a plurality of values in the path in the resource snapshot as a capture group; and applying the Modified JSON Patch operation to the resource snapshot using the capture group; and restoring the application to the second cloud environment based on the transformed resource snapshot specifying the second resource configuration.

2. The computer-implemented method of claim 1, further comprising:

determining that performance of the transformation succeeded; and wherein restoring the application to the second cloud environment comprises restoring the application to the second cloud environment in response to determining that the performance of the transformation succeeded.

3. The computer-implemented method of claim 2, wherein determining that the performance of the transformation succeeded comprises determining, using at least one test operation, that the resource snapshot is formatted in the second resource configuration.

4. The computer-implemented method of claim 1, wherein another Modified JSON Patch operation from the set of Modified JSON Patch operations in the transformation includes a path reference or a value reference with a wildcard character.

5. The computer-implemented method of claim 1, further comprising:

receiving a selection of the second cloud environment;

detecting the second resource configuration for the second cloud environment; and outputting a description of the second resource configuration to a user.

6. The computer-implemented method of claim 5, wherein detecting the second resource configuration comprises detecting, using at least one test operation, one or more paths of the second resource configuration in the second cloud environment.

7. The computer-implemented method of claim 1, further comprising:

receiving a selection of the second cloud environment;

detecting the second resource configuration for the second cloud environment; and selecting the transformation based on the second resource configuration.

8. The computer-method of claim 7, wherein detecting the second resource configuration comprises detecting, using at least one test operation, one or more paths of the second resource configuration in the second cloud environment.

9. A system for restoring an application, comprising:

one or more memories; and at least one processor each coupled to at least one of the memories and configured to perform operations comprising:

performing a transformation, comprising a set of Modified JavaScript Object Notation (JSON) Patch operations, on a resource snapshot that specifies a first resource configuration indicating where portions of the application are accessed in a first cloud environment, thereby transforming the resource snapshot from the first resource configuration to a second resource configuration indicating where portions of the application are accessed in a second cloud environment, wherein performing a Modified JSON Patch operation from the set of Modified JSON Patch operations comprises:

selecting, using a regular expression, a plurality of strings in a path in the resource snapshot or a plurality of values in the path in the resource snapshot as a capture group; and applying the Modified JSON Patch operation to the resource snapshot using the capture group; and restoring the application to the second cloud environment based on the transformed resource snapshot specifying the second resource configuration.

10. The system of claim 9, wherein the operations further comprise:

determining that performance of the transformation succeeded; and wherein restoring the application to the second cloud environment comprises restoring the application to the second cloud environment in response to determining that the performance of the transformation succeeded.

11. The system of claim 10, wherein the determining that the performance of the transformation succeeded comprises determining, using at least one test operation, that the resource snapshot is formatted in the second resource configuration.

12. The system of claim 9, wherein another Modified JSON Patch operation from the set of Modified JSON Patch operations in the transformation includes a path reference or a value reference with a wildcard character.

13. The system of claim 9, wherein the operations further comprise:

receiving a selection of the second cloud environment;

detecting the second resource configuration for the second cloud environment; and outputting a description of the second resource configuration to a user.

14. The system of claim 13, wherein detecting the second resource configuration comprises detecting, using at least one test operation, one or more paths of the second resource configuration in the second cloud environment.

15. The system of claim 9, wherein the operations further comprise:

receiving a selection of the second cloud environment;

detecting the second resource configuration for the second cloud environment; and selecting the transformation based on the second resource configuration.

16. The system of claim 15, wherein detecting the second resource configuration comprises detecting, using at least one test operation, one or more paths of the second resource configuration in the second cloud environment.

17. A non-transitory computer-readable medium having instructions stored thereon that, when executed by at least one computing device, cause the at least one computing device to perform operations comprising:

performing a transformation comprising a set of Modified JavaScript Object Notation (JSON) Patch operations on a resource snapshot that specifies a first resource configuration indicating where portions of an application are accessed in a first cloud environment, thereby transforming the resource snapshot from the first resource configuration to a second resource configuration indicating where portions of the application are accessed in a second cloud environment, wherein performing a Modified JSON Patch operation from the set of Modified JSON Patch operations comprises:

selecting, using a regular expression, a plurality of strings in a path in the resource snapshot or a plurality of values in the path in the resource snapshot as a capture group; and applying the Modified JSON Patch operation to the resource snapshot using the capture group; and restoring the application to the second cloud environment based on the transformed resource snapshot specifying the second resource configuration.

18. The non-transitory computer-readable storage medium of claim 17, the operations further comprising:

determining, using at least one test operation, that performance of the transformation succeeded, wherein the at least one test operation detects that the resource snapshot is formatted in the second resource configuration; and wherein restoring the application to the second cloud environment comprises restoring the application to the second cloud environment in response to determining that the performance of the transformation succeeded.

19. The non-transitory computer-readable storage medium of claim 17, wherein another Modified JSON Patch operation from the set of Modified JSON Patch operations in the transformation includes a path reference or a value reference with a wildcard character.

20. The non-transitory computer-readable storage medium of claim 17, the operations further comprising:

receiving a selection of the second cloud environment;

detecting, using at least one test operation, the second resource configuration for the second cloud environment, wherein the at least one test operation detects one or more paths of the second resource configuration in the second cloud environment; and outputting a description of the second resource configuration to a user.

* * * * *